(12) United States Patent
Berg et al.

(10) Patent No.: US 11,797,895 B2
(45) Date of Patent: Oct. 24, 2023

(54) ENVIRONMENTAL MATCHING TECHNIQUES

(71) Applicant: ADVANCED AGRILYTICS HOLDINGS, LLC, Indianapolis, IN (US)

(72) Inventors: William Kess Berg, Clayton, IN (US); Jon J. Fridgen, Tolono, IL (US); Aaron W. Gault, Greensburg, IN (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 0 days.

(21) Appl. No.: 17/827,247

(22) Filed: May 27, 2022

(65) Prior Publication Data

US 2022/0293288 A1  Sep. 15, 2022

Related U.S. Application Data

(63) Continuation of application No. 17/103,836, filed on Nov. 24, 2020, now Pat. No. 11,348,696, which is a
(Continued)

(51) Int. Cl.
*G06N 20/20* (2019.01)
*G16Y 20/10* (2020.01)
(Continued)

(52) U.S. Cl.
CPC ............. *G06N 20/20* (2019.01); *G06F 17/16* (2013.01); *G06F 17/18* (2013.01); *G06F 18/22* (2023.01);
(Continued)

(58) Field of Classification Search
CPC ...... G06K 9/6215; G06N 20/20; G06N 5/003; G16Y 20/10; G16Y 10/05; G06F 17/16; G06F 17/18
(Continued)

(56) References Cited

U.S. PATENT DOCUMENTS 5,721,679 A * 2/1998 Monson ............... A01B 79/005
701/50
10,342,174 B2 7/2019 Xu et al.
(Continued)

*Primary Examiner* — Aditya S Bhat
(74) *Attorney, Agent, or Firm* — MARSHALL, GERSTEIN & BORUN LLP; Randall G. Rueth

(57) ABSTRACT

A method includes receiving raw machine data; determining topographic attributes and underlying environmental characteristics; encoding the respective topographic attributes and the underlying environmental characteristics in hexagrid data structures; and storing the hexagrid data structures in a memory. A computing system includes a processor; and a memory storing instructions that, when executed by the one or more processors, cause the computing system to: receive raw machine data; determine topographic attributes and underlying environmental characteristics; encode the respective topographic attributes and the underlying environmental characteristics in hexagrid data structures; and store the hexagrid data structures in the memory. A non-transitory computer readable medium containing program instructions that when executed, cause a computer to: receive raw machine data; determine topographic attributes and underlying environmental characteristics; encode the respective topographic attributes and the underlying environmental characteristics in hexagrid data structures; and store the hexagrid data structures in a memory.

20 Claims, 9 Drawing Sheets

Related U.S. Application Data continuation of application No. 16/797,850, filed on Feb. 21, 2020, now Pat. No. 10,878,967.

(51) Int. Cl.
  *G16Y 10/05* (2020.01)
  *G06F 17/18* (2006.01)
  *G06F 17/16* (2006.01)
  *G06F 18/22* (2023.01)
  *G06N 5/01* (2023.01)

(52) U.S. Cl.
  CPC ............... *G06N 5/01* (2023.01); *G16Y 10/05* (2020.01); *G16Y 20/10* (2020.01)

(58) Field of Classification Search
  USPC ............................................................ 702/1
  See application file for complete search history.

(56) References Cited

U.S. PATENT DOCUMENTS

| | | |
|---|---|---|
| 10,482,547 B2 | 11/2019 | Stuber et al. |
| 10,878,967 B1 | 12/2020 | Berg et al. |
| 11,160,220 B2 | 11/2021 | Hassanzadeh et al. |
| 2013/0066666 A1 | 3/2013 | Anderson, Jr. et al. |
| 2013/0184944 A1* | 7/2013 | Missotten ............ A01D 41/127 |
| | | 701/50 |
| 2017/0090068 A1* | 3/2017 | Xiang ..................... G01W 1/10 |
| 2017/0169523 A1 | 6/2017 | Xu et al. |
| 2018/0349520 A1 | 12/2018 | Bhalla et al. |
| 2019/0327881 A1* | 10/2019 | Xu ........................... G06N 5/04 |

* cited by examiner

ENVIRONMENTAL MATCHING TECHNIQUES

CROSS-REFERENCE TO RELATED APPLICATIONS

This application is a continuation of U.S. patent application Ser. No. 17/103,836, entitled ENVIRONMENTAL MATCHING TECHNIQUES, filed on Nov. 24, 2020, which is a continuation of U.S. patent application Ser. No. 16/797,850, entitled METHODS AND SYSTEMS FOR ENVIRONMENTAL MATCHING, filed on Feb. 21, 2020, and hereby incorporated by reference in its entirety.

FIELD OF THE DISCLOSURE

The present disclosure is generally directed to methods and systems for environmental matching, and more specifically, for identifying spatial environment matches for observations in a plurality of data sets collected via site-specific trials and/or crop management.

BACKGROUND

Conventional agricultural science techniques for analyzing a plurality of plots of land (e.g., two or more agricultural fields) are lacking. For example, conventional techniques for analyzing the plurality of plots of land include comparing a plurality of plots of land by driving the plurality of plots in strips, or rows, to collect machine data corresponding to the plurality of plots. The conventional methods include calculating a statistic (e.g., an average yield) for each strip. Such conventional techniques fall short. For example, the conventional methods merely calculate a strip-wise or field-wise statistic (e.g., an average yield of an entire field or row within a field), and do not take into account inter-strip, or inter-field, environmental variability in terms of topography (e.g., elevation, slope curvature, soil wetness index (SWI)), soil physical and/or chemical properties, or any other distinguishing features. Collecting field-level data at a second or sub-second increment and calculating a mean is a crude and not informative metric. Thus, field comparisons lack depth and are not useful for analytic purposes.

Further, conventional techniques do now allow for rich spatial analysis. The conventional techniques cannot be used to compare sub-sections within a field or a plurality of fields to determine spatial similarity or for other purposes. Improved techniques are needed.

BRIEF SUMMARY

In one aspect, a computer-implemented method for improved agricultural field information storage includes (i) receiving raw machine data corresponding to a plurality of environments, each environment located within a respective agricultural field; (ii) determining, for each of the plurality of environments, respective topographic attributes and respective underlying environmental characteristics by processing the raw machine data; (iii) encoding, for each of the plurality of environments, the determined respective topographic attributes and the respective underlying environmental characteristics in one or more respective hexagrid data structures; and (iv) storing the one or more respective hexagrid data structures in one or more non-transitory computer-readable memories.

A computing system includes one or more processors; and one or more memories storing instructions that, when executed by the one or more processors, cause the computing system to: (i) receive raw machine data corresponding to a plurality of environments, each environment located within a respective agricultural field; (ii) determine, for each of the plurality of environments, respective topographic attributes and respective underlying environmental characteristics by processing the raw machine data; (iii) encode, for each of the plurality of environments, the determined respective topographic attributes and the respective underlying environmental characteristics in one or more respective hexagrid data structures; and (iv) store the one or more respective hexagrid data structures in the one or more memories.

A non-transitory computer readable medium containing program instructions that when executed, cause a computer to: (i) receive raw machine data corresponding to a plurality of environments, each environment located within a respective agricultural field; (ii) determine, for each of the plurality of environments, respective topographic attributes and respective underlying environmental characteristics by processing the raw machine data; (iii) encode, for each of the plurality of environments, the determined respective topographic attributes and the respective underlying environmental characteristics in one or more respective hexagrid data structures; and (iv) store the one or more respective hexagrid data structures in one or more non-transitory computer-readable memories.

BRIEF DESCRIPTION OF THE DRAWINGS

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
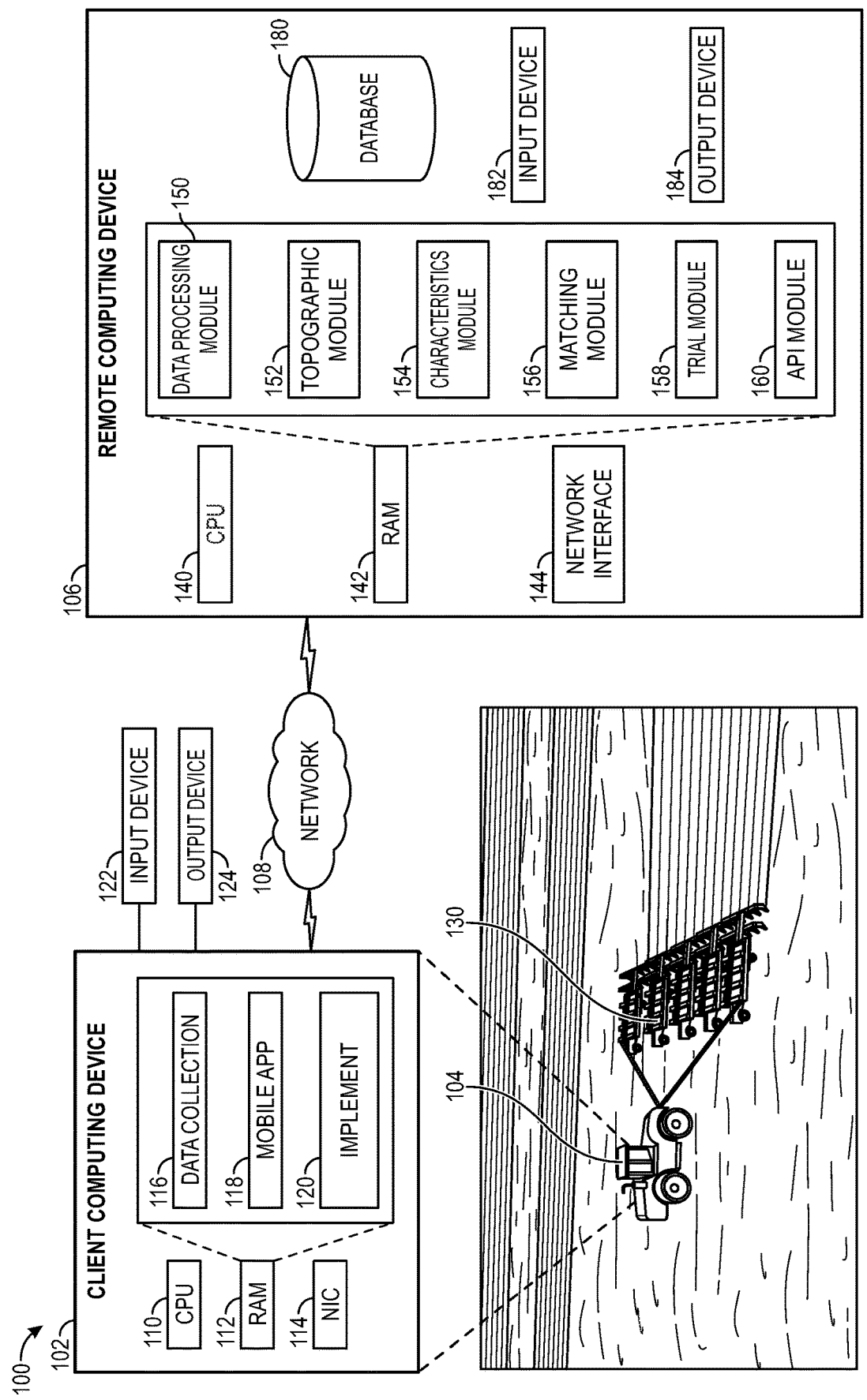
FIG. 1 depicts an exemplary computing environment, according to an embodiment.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, methods and systems for performing environmental matching, and more specifically, for identifying spatial environment matches for respective sets of observations in a plurality of data sets each corresponding to a respective agricultural field.

An agricultural analytics (i.e., agrilytics) company may enable the comparison of multiple agricultural fields, or multiple segments/environments of a one or more agricultural fields. For example, the agrilytics company may conduct a trial wherein the agrilytics company compares plurality of fields/areas planted with a plurality of respective hybrids (e.g., a hybrid A and a hybrid B). The techniques discussed herein allow the agrilytics company to compare trial products (e.g., the two hybrids A and B) at a finer level than conventional techniques have previously allowed. In another example, a field (e.g., an agricultural field) may include one or more environments. The agrilytics company may isolate one or more environments at the field level and compare those environments to one or more environments of the field or second field to gain more accurate and complete information of the state of the field and the second field, including the respective one or more environments therein.

The agrilytics company may employ a method of and/or provide an environmental matching system for, collecting a set of underlying environmental characteristics corresponding to a first environment. The underlying environmental characteristics may be referred to as a plurality of attributes in some embodiments. The underlying environmental characteristics corresponding to the first environment may include, for example, measurement data such as soil organic matter (OM), cation-exchange capacity (CEC), elevation, slope, topographic attributes, etc. The environmental matching method/system may collect a second set of environmental characteristics corresponding to a second environment. The environmental matching method/system may compare the first set of environmental characteristics to the second set of environmental characteristics to determine the similarity of the first environment to the second environment.

In some embodiments, the first set of underlying environmental characteristics may be structured as a set of observations. The observations may be collected by, for example, an implement (e.g., a tractor), an attachment to the implement (e.g., tillage equipment), and/or one or more sensors coupled to the implement and/or the attachment. In some embodiments, the sensor may be a part of and/or coupled to, a mobile computing device of an operator (e.g., an operator of the implement). By comparing underlying environmental characterizations, the present techniques allow the agrilytics company or another party to identify similarities between environments, and to compare one or more (e.g., each) observation in the first environment to one or more (e.g., each) observation in the second environment. The present techniques may use the comparison to, for example, determine the similarity of a first field to another field, to determine most similar or like environments, to compare the effects of treatments (e.g., a fertilization treatment, a pesticide treatment, etc.), and/or the effect of different plantings (e.g., one or more seed varieties).

In yet another embodiment, the present techniques may be used to compare one or more environmental aspects of a first geography (e.g., a field, an environment, etc.) to one or more environmental aspects of a second geography (e.g., a second field, a second environment, etc.). For example, a first geography may relate to the planting of a seed hybrid in a field located the State of Illinois. The present techniques may collect first environmental characteristics relating to the Illinois field. A second geography may relate to a field in the State of Indiana. The present techniques may be used to collect a first set of observations relating to the Illinois field and a second set of observations relating to the Indiana field. The present techniques may be used to match one or more locations in the Illinois field to one or more locations in the Indiana field using the respective underlying environmental characteristics of the two fields. For example, in addition to, or alternatively to the above-referenced underlying environmental characteristics, the two fields may be compared on the basis of precipitation patterns, solar radiation levels, evapotranspiration rates, etc. Of course, in some embodiments, more than two fields may be compared.

The present techniques may analyze different groups or sets of underlying environmental characteristics, depending on the outcome being analyzed/predicted and/or the type of trial. In other words, the present techniques may be applied on a site-specific basis. For example, an environmental matching algorithm may analyze a first set of underlying environmental characteristics in a trial of a nitrogen fertilizer.

The environmental matching algorithm may analyze a second set of underlying environmental characteristics in a trial of a seed hybrid. In still further embodiments, a third set of underlying environmental characteristics may be analyzed for a first geographic region and a fourth set of underlying environmental characteristics may be analyzed for a second geographic region. For example, each of the sets of underlying environmental characteristics may include a unique set of underlying environmental characteristics selected from a global list of underlying environmental characteristics. The global list of underlying environmental characteristics and the respective sets of underlying environmental characteristics may be stored in an electronic database and accessed using a unique identifier.

The present techniques include methods and systems for collecting machine data and for analyzing the machine data to compare environments between a plurality of geographic locations. In some embodiments, the present techniques may generate one or more spatial data files encoded in a suitable file format, such as a commercial or open source shapefile, a GeoJSON format, a Geography Markup Language (GML) file, etc. Such spatial data files may include one or more layers (i.e., map layers, wherein each layer represents an agricultural characteristic. For example, elevation may be represented by one or more layer within a shapefile. The individual layer(s) and/or files may be shared between multiple computing devices of an agricultural company, provided or sold to customers, stored in a database, etc.

The present environmental matching techniques may be used for any suitable purpose, including but not limited to use as an input to a predictive model, for seeding purposes, for tillage, etc.

Exemplary Computing Environment

FIG. 1 depicts an exemplary computing environment 100 in which the techniques disclosed herein may be implemented, according to an embodiment.

The environment 100 includes a client computing device 102, an implement 104, a remote computing device 106, and a network 108. Some embodiments may include a plurality of client computing devices 102, a plurality of implements, and/or a plurality of remote computing devices 106. Multiple and/or separate networks may communicatively couple different components of the environment 100, such as the client computing device 102 and the implement 104, and/or the client computing device 102 and the remote computing device 106.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. In some embodiments the client computing device 102 may be temporarily or permanently affixed to the implement 102. For example, the client computing device 102 may be the property of a customer, an agricultural analytics (or "agrilytics") company, an implement manufacturer, etc.

The client computing device 102 includes a processor 110, a memory 112 and a network interface controller (NIC) 114. The processor 110 may include any suitable number of processors and/or processor types, such as CPUs and one or more graphics processing units (GPUs). Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an implement control module 120, as described in more detail below. More or fewer modules may be included in some embodiments. The NIC 114 may include any suitable network interface controller(s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.).

The one or more modules stored in the memory 112 may include respective sets of computer-executable instructions implementing specific functionality. For example, in an embodiment, the data collection module 116 includes a set of computer-executable instructions for collecting a machine data set from an implement (e.g., the implement 104). The machine data collection module 116 may include a respective set of instructions for retrieving/receiving data from a plurality of different implements. For example, a first set of instructions may be configured to retrieve/receive machine data from a first tractor manufacturer, while a second set of instructions is for retrieving/receiving machine data from a second tractor manufacturer. In another embodiment, the first and second set of instructions may be for, respectively, receiving/retrieving data from tillage equipment and/or a harvester. Of course, some libraries of instructions may be provided by the manufacturers of various implements and/or attachments, and may be loaded into the memory 112 and used by the data collection module 116. The data collection module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The machine data may include any information generated by the client computing device 102, the implement 104, and/or the attachments 130. For example, the machine data may include sensor measurements of engine load data, fuel burn data, draft, fuel consumption, wheel slippage, etc. The machine data may include application/treatment rates and a geographic identifier (e.g., one or more location coordinates). The machine data may include one or more time series, such that one or more measured values are represented in a single data set at a common interval (e.g., one-second). For example, the machine data may include a first time series of fertilizer application rate at a one-second interval, a second time series of seed application, etc. The machine data is location-aware. For example, the client computing device 102 may add location metadata to the machine data, such that the machine data reflects an absolute and/or relative geographical position (i.e., location, coordinate, offset, heading, etc.) of the client computing device 102, the implement 104, and/or the attachments 130 within the agricultural field at the precise moment that the client computing device 102 captures the machine data. It will also be appreciated by those of skill in the art that some sensors and/or agricultural equipment may generate machine data that is received by the client computing device 102 that already includes location metadata added by the sensors and/or agricultural equipment. In an embodiment wherein the machine data comprises a time series, each value of the time series may include a respective geographic metadata entry.

The data collection module 116 may receive and/or retrieve the machine data via an API through a direct hardware interface (e.g., via one or more wires) and/or via a network interface (e.g., via the network 108). The data collection module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data collection module 116 may include instructions for modifying and/or storing the machine data. For example, the data collection module 116 may parse the raw machine data into a data structure. The data collection module 116 may write the raw machine data onto a disk (e.g., a hard drive in the memory 112). In some embodiments, the data collection module 116 may transfer the raw machine data, or modified machine data, to a remote computing system/device, such as the remote computing device 106. The transfer may, in some embodiments, take the form of an SQL insert command. In effect, the data collection module 116 performs the function of receiving, processing, storing, and/or transmitting the machine data. In some embodiments, the data collection module 116 may retrieve an identifier (e.g., a treatment identifier, a trial identifier, etc.) from another module. The data collection module 116 may merge the identifier into the machine data, and associate the identifier with the collected machine data.

The mobile application module 118 may include computer-executable instructions that display one or more graphical user interfaces (GUIs) on the output device 124 and/or receives user input via the input device 122. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in embodiments where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with the user may interact, are discussed below. The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying visual maps in a GUI. Specifically, the application module 118 may include computer-executable instructions for displaying one or more map layers in the of the client computing device 102. For example, the map layers may be used to depict comparisons of one or more fields generated using the environmental matching algorithm of the present techniques.

The implement control module 120 includes computer-executable instructions for controlling the operation of an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate or decelerate. In some embodiments, the implement control module 120 may cause one of the attachments 130 to raise or lower the disc arm of tillage equipment, or to apply more or less downward or upward pressure on the ground. Practically, the implement control module 120 has all of the control of the implement 104 and/or attachments 130 as does the human operator. The implement control module 120 may include a respective set of instructions for controlling a plurality of implements. For example, a first set of instructions may be configured to control an implement of a first tractor manufacturer, while a second set of instructions is configured to control an implement of a second tractor manufacturer.

In another embodiment, the first and second set of instructions may be configured to control, respectively, tillage equipment and/or a harvester. Of course, many configurations and uses are envisioned beyond those provided by way of example. The control module 120 may include computer-executable instructions for executing one or more agricultural prescriptions with respect to a field. For example, the control module 120 may execute an agricultural prescription that specifies, for a given agricultural field, a path for the implement 104 to follow within the field, and an varying application rate of a chemical (e.g., a fertilizer, an herbicide, a pesticide, etc.) or a seed to apply at various points along the path. The control module 120 may analyze the current location of the implement 104 and/or the attachments 130 in real-time (i.e., as the control module 120 executes the agricultural prescription). The computer-executable instructions for executing the one or more agricultural prescriptions may be based on comparisons generated by the environmental matching algorithm. In some embodiments, the computer-executable instructions may directly analyze the output of the environmental matching algorithm to determine one or more actions for the implement 104 to take.

In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or an attachments 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, tillage equipment, a planter, a baler, a sprayer, an irrigator, a sorter, an harvester, etc. The implement 104 may include one or more sensors (not depicted) and the implement 104 may be coupled to one or more attachments 130. For example, the implement 104 may include one or more sensors for measuring respective implement values of liquid application rate, seed application rate, engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., tillage equipment). The attachments 130 may include one or more sensors (not depicted) that may differ in number and/or type according to the respective type of the attachments 130 and the particular embodiment/scenario. For example, tillage attachments 130 may include one or more soil depth sensors. It should be appreciated that many attachments 130 sensor configurations are envisioned. For example, the attachments 130 may include one or more cameras. The attachments 130 may be connected to the implement 104 via wires or wirelessly, for both control and communications. For example, attachments 130 may be coupled to the client computing device 102 of the implement 104 via a wired and/or wireless interface for data transmission (e.g., cellular data via 4G/5G, IEEE 802.11, WiFi, etc.) and main/auxiliary control (e.g., 7-pin, 4-pin, etc.). The client computing device 102 may communicate bidirectionally (i.e., transmit data to, and/or receive data from) with the remote computing device 106 via the network 108.

The client computing device 102 includes an input device 122 and an output device 124. The input device 122 may include any suitable device or devices for receiving input, such as one or more microphone, one or more camera, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an agrilytics company.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a data processing module 150, a topographic module 152, a characteristics module 154, a matching module 156, a trial module 158, and an API module 160. The NIC 144 may include any suitable network interface controller(s), such as wired/wireless controllers (e.g., Ethernet controllers), and facilitate bidirectional/multiplexed networking over the network 106 between the remote computing device 106 and other components of the environment 100 (e.g., another remote computing device 106, the client computing device 102, etc.).

The one or more modules stored in the memory 142 may include respective sets of computer-executable instructions implementing specific functionality. For example, in an embodiment, the data processing module 150 includes computer-executable instructions for receiving/retrieving data from the client computing device 102, the implement 104, and/or the attachments 130. For example, the data processing module 150 may include instructions that when executed by the processor 140, cause the remote computing device 106 to receive/retrieve machine data. The data processing module 150 may include further instructions for storing the machine data in one or more tables of the database 180. The data processing module 150 may store raw machine data, or processed data. The data processing module 150 may include instructions for processing the raw machine data to generate processed data. For example, the processed data may be data that is represented using data types data of a programming language (e.g., R, C#, Python, JavaScript, etc.).

The data processing module 150 may include instructions for validating the data types present in the processed data. For example, the data processing module 150 may verify that a value is present (i.e., not null) and is within a particular range or of a given size/structure. In some embodiments, the data processing module 150 may transmit processed data to/from an electronic database in response to a query, or request, from the client computing device 102. The data processing module 150 may transmit the processed data via HTTP or via another data transfer suitable protocol. In some embodiments, the data processing module 150 may transform data received from the data collection module 116 of the client computing device 102. For example, the data processing module 150 may transform raw machine data into a spatial data format.

The topographic module 152 may include instructions for analyzing raw machine data and computing topographic data attributes. For example, the topographic module 152 may be configured to generate relative elevation and slope/soil wetness index (SWI) data based on raw machine data. The topographic module 152 may store topographic data attributes in an electronic database. The topographic module 152 may be configured to retrieve and/or provide topographic data to other modules in the remote computing device 106. The topographic data may take the form of raw data (e.g., a list of geographic coordinates and elevation in feet above sea level) or more complex data, such as an elevation map layer/spatial data file. The topographic module 152 may source elevation data from public sources, such as the United States Geological Survey (USGS) National Elevation Dataset (NED) database, LiDAR data available via state/county geospatial data clearinghouses, etc. In some embodiments, the data processing module 150 may provide raw data to the topographic module 152, wherein instructions within the topographic module 152 infer the elevation of a particular plot of land by analyzing the raw data. The elevation data may be stored in a two-dimensional (2D) or three-dimensional (3D) data format, depending on the embodiment and scenario.

The topographic module 152 may include computer-executable instructions for generating one or more map layers and/or one or more geospatial data files (e.g., shapefiles). The topographic module 152 may store the generated map layers and/or geospatial files in an electronic database, and/or in the memory 142. The topographic module 152 may provide the geospatial files and/or map layers to other components of the environment 100, such as the client computing device 102. Specifically, the topographic module 152 may include an API endpoint that allows another application/module (e.g., the mobile application module 118 to submit a query/request to receive/retrieve one or more geospatial files and/or one or more map layers via the network 108. It will be appreciated by those of skill in the art that the topographic module 152 may use existing standardized and/or proprietary software libraries to generate the maps and/or shape files. Further, the topographic module 152 may combine one or more data sets from an electronic database into a single map layer/geospatial file, or into multiple respective map layers. For example, the topographic module 152 may generate a composite geospatial data file that includes a first map layer representing a set of attributes belonging to a first field, and a second map layer representing a set of attributes belonging to a second field. The topographic module 152 may also generate multiple layers, wherein each corresponds to an underlying environmental attribute (e.g., a slope layer, an OM layer, a CEC layer, etc.). The layers may be transmitted to and displayed in user devices (e.g., the mobile computing device 102).

The characteristics module 154 may store, retrieve, sort and refine a global list of underlying environmental characteristics. For example, the characteristics may include information such as soil organic matter cation-exchange capacity, relative elevation, slope, topographic attributes, precipitation patterns, solar radiation levels, evapotranspiration rates, etc. Those of ordinary skill in the art will appreciate that the characteristics provided as examples are a subset of the global list of underlying environmental characteristics, and the use of more characteristics is envisioned. The underlying environmental characteristics may be simple or compound.

The matching module 156 may include one or more matching algorithms, as described below. For example, the matching module may use an algorithm for determining the underlying characteristics that are most germane to predicting a particular outcome or for comparing a plurality of agricultural segments (e.g., two or more fields and/or a plurality of sub-parts of two or more fields). Herein, an "area" may refer to one or more field and/or one or more sub-part of a field. For example, the matching module 156 may use a random forest tree classifier, a partial-least-squares (PLS) regression to determine the set of characteristics used for analyzing a particular agricultural operation and/or for a particular type of trial.

For example, the random forest tree may indicate the use of a first set of underlying environmental attributes for analyzing a corn hybrid trial. The random forest tree may indicate the use of a second set of underlying environmental attributes for analyzing a fungicide trial. The random forest tree may indicate the use of a third set of underlying environmental attributes for analyzing a seeding rate trial. The random forest tree may indicate the use of a fourth set of underlying environmental attributes for analyzing nitrogen application. The matching module 156 may compare a plurality of environments, wherein each environment is compared to the other by generating a matrix. Comparing each of the plurality of environments to each of the other plurality of environments may include calculating a match/no match indication for every spatial point within the plurality of environments.

Given a first point in the first environment (e.g., a first field or a first spatial portion of the first field), the matching module 156 may compare the first point to every point in a second environment (e.g., a second field, a second spatial portion of the first field, or a second spatial portion). In some embodiments, a cutoff is used to determine whether two compared points are matches or not. Each point within the environments compared by the matching module 156 may be part of a hexagrid, as discussed below.

In some embodiments, the matching module 156 may use a random forest algorithm to identify attributes that are responsible for variation. The random forest classifier may identify variables of importance (e.g., relative elevation, SWI, OM, soil test phosphorus, etc.). A user may apply the output of the random forest algorithm to tune the variables of a field, such as by varying the level of a treatment to address the variable of importance. In another embodiment, the matching module 156 may analyze the underlying environmental characteristics using a PLS.

In some embodiments, the matching module 156 may be configured as a site-specific environmental matching algorithm that analyzes site-specific environmental attributes, such as soil attributes including organic matter, CEC, phosphorus, and/or potassium. The site-specific environmental matching algorithm may further analyze topography (e.g., relative elevation, SWI, etc.), derived layers (e.g., nitrogen loss by landscape position), yield, and/or imagery. It should be understood that many additional attributes may be analyzed by the site-specific and macro embodiments of the environmental matching algorithm. The site-specific and macro embodiments of the environmental matching algorithm may analyze the above-described attributes for matching.

Those of skill in the art will appreciate that in some embodiments, other types of machine learning models/algorithms may be selected. For example, embodiments may use supervised and unsupervised machine learning techniques, including classification, regression, clustering, dimensionality reduction (e.g., autoencoding), support vector machines, Bayesian networks, and/or neural networks (e.g., deep artificial neural networks, convolutional neural networks, etc.).

The environmental matching module 156 may load a series of packages, depending on the programming language (s) used to implement the environmental matching algorithm. For example, embodiments may include a package for reading/writing to a shapefile, a package for performing spatial data analysis and modeling, a package for generating raster images, etc. The environmental matching module 156 may analyze as-planted data. The environmental matching module 156 may compute an inverted variance-covariance matrix for a plurality of attributes.

The environmental matching module 156 may perform a head-to-head comparison between the plurality of products by retrieving data corresponding to each product, counting the number of treatments, and for each treatment, retrieving data corresponding to each treatment. The environmental matching module 156 may compare each treatment to every other treatment. The environmental matching module 156 may compare every observation within a first treatment to be compared to each observation in a second treatment.

In some embodiments, the environmental matching module 156 may determine the distance between a first spatial point and a population of spatial points using a generalized spatial distance function defined as:

$$D^2 = (x-u)^T \Sigma^{-1} (x-u)$$

wherein $D^2$ is the generalized distance, x is the matrix of attributes for the population of spatial locations, u is the vector of attributes for the spatial location to which matches are being sought; and $\Sigma^{-1}$ is the inverted variance-covariance matrix of the attributes used to define the environmental characteristics. The generalized distance $D^2$ is unit-less and scale-invariant. In some embodiments, the environmental matching module 156 may compute the distance of each observation using a Mahalanobis distance function.

When determining whether two spatial regions match, the environmental matching module 156 may apply a predetermined threshold value. The threshold value may be determined by a machine learning algorithm, in some embodiments. For example, a machine learning module may derive the threshold by analyzing a distribution of an entire field and respective machine data. The environmental matching module 156 may determine that any point having a respective environmental value greater than the predetermined threshold value is a match. The environmental matching module 156 may apply different matching algorithms, depending on the embodiment and scenario, as discussed below.

The trial module 158 may store information related to agricultural field trials. The trial module 158 may assist in the direction of agricultural field trials. For example, the trial module 158 may receive a request from a client device (e.g., the client computing device 102) including a trial record object. The trial record object may include items identifying a trial, including a trial name, a trial date, one or more planting locations (e.g., one or more area), one or more trial products (e.g., a crop seed hybrid, a fertilizer, a fungicide, etc.). Each of the one or more planting locations may be associated with one or more respective trial products. The trial module 158 may store one or more trial record objects in an electronic database.

The trial module 158 may allow a user to access the stored trials, for example, by viewing a list of stored trials. The user may select one of the trials using the mobile application 118. For example, the user may access the input device 122 (e.g., via key press) to begin a trial. Once begun, the trial module 158 may store the start time of the trial in the electronic database. The mobile application 118 may include instructions for updating the trial based on the location of the implement 104. For example, the mobile application module 118 may include instructions that, when executed, cause the mobile application module 118 to receive the position (e.g., from a GPS module) of the implement 104. The instructions may further cause the mobile application 118 to determine whether the implement 104 is within an area (e.g., a field and/or a sub-field) that corresponds to one of the trial record objects. When the implement is within the area that corresponds to one of the trial record objects, the mobile application 118 may automatically begin recording data corresponding to the trial record object, and/or display a notification to the user (e.g., via the output device 124) prompting the user to begin storing data related to the trial. The prompt may include information related to the trial (e.g., the trial name).

The API module 160 may be used to access the results of the environmental matching. For example, an agrilytics company may provide access to the API module 160 to a customer. The customer may collect environmental data and access the API, providing the collected environmental data as one or more input parameters. The API module 160 may return results that include one or more comparisons (e.g., environmental matching analyses) of the environmental data, as described herein. The environmental matching system provides the customer with a true spatial analysis of agricultural trial information, in a far more detailed and comprehensive way than conventional techniques.

In still further embodiments, the environmental matching system may include instructions for analyzing results generated by comparing the environmental characteristics of multiple geographic, field-based and/or field environments to generate one or more recommendations. The recommendations may be integrated by the API module 160. For example, the API user may submit environmental data via an API of the API module 160 in a first API call. The API user may then submit a second API call, or receive a result of the first API call, wherein the API user receives feedback regarding one or more interventions that may be needed to agricultural aspects of the API user's field. The environmental matching system (e.g., the environment 100) may, in some embodiments, provide the API user with geographic comparisons.

For example, the present environmental matching techniques may enable the grower to improve yield by adjusting seed, fertilizer, etc. based on historical or time-based growing season (e.g., year-over-year) analyses. In a first growing season, the grower may analyze the yield of a first field/environment. The grower may compare the performance of an aspect of the first field/environment. Some of the comparisons may be subject to intervention-level effects. For example, in a fungicide trial, the fungicide may work well in a first year but not in a second year. In particular, the environmental matching system enables the user (e.g., an analyst, an agrilytics company advisor, an independent grower, etc.) to partition environments and eliminate "yoyo" effects. Whereas environmental variation is typically lost through field-level averaging, the present techniques allow the user to determine and process (e.g., visualize) the changes occurring to environments in multiple dimensions.

The remote computing device 106 may further include one or more database 180, an input device 182, and an output device 184. The database 180 may be implemented as a relational database management system (RDBMS) in some embodiments. For example, the data store 140 may include one or more structured query language (SQL) database, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 140.

The database 180 may store information received from users, via the input device 122 of the client computing device 102 and/or via the input device 182 of the remote computing device 106. The database 180 may be configured for the storage and retrieval of spatial data, in some embodiments. The client computing device 102 may include a module (not depicted) including a set of instructions for querying an RDBMS, spatial data, etc. For example, the client computing device 102 may include a set of database drivers for accessing the database 180 of the remote computing device 106. In some embodiments, the database 180 may be located remotely from the remote computing device 104, in which case the remote computing device 104 may access the database 180 via the NIC 112 and the network 106.

The input device 182 may include any suitable device or devices for receiving input, such as one or more microphone, one or more camera, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services. One or more application programming interfaces (APIs) may be accessible by the remote computing device 106.

Exemplary Embodiments for Use within an Agricultural Field

Figure 2:
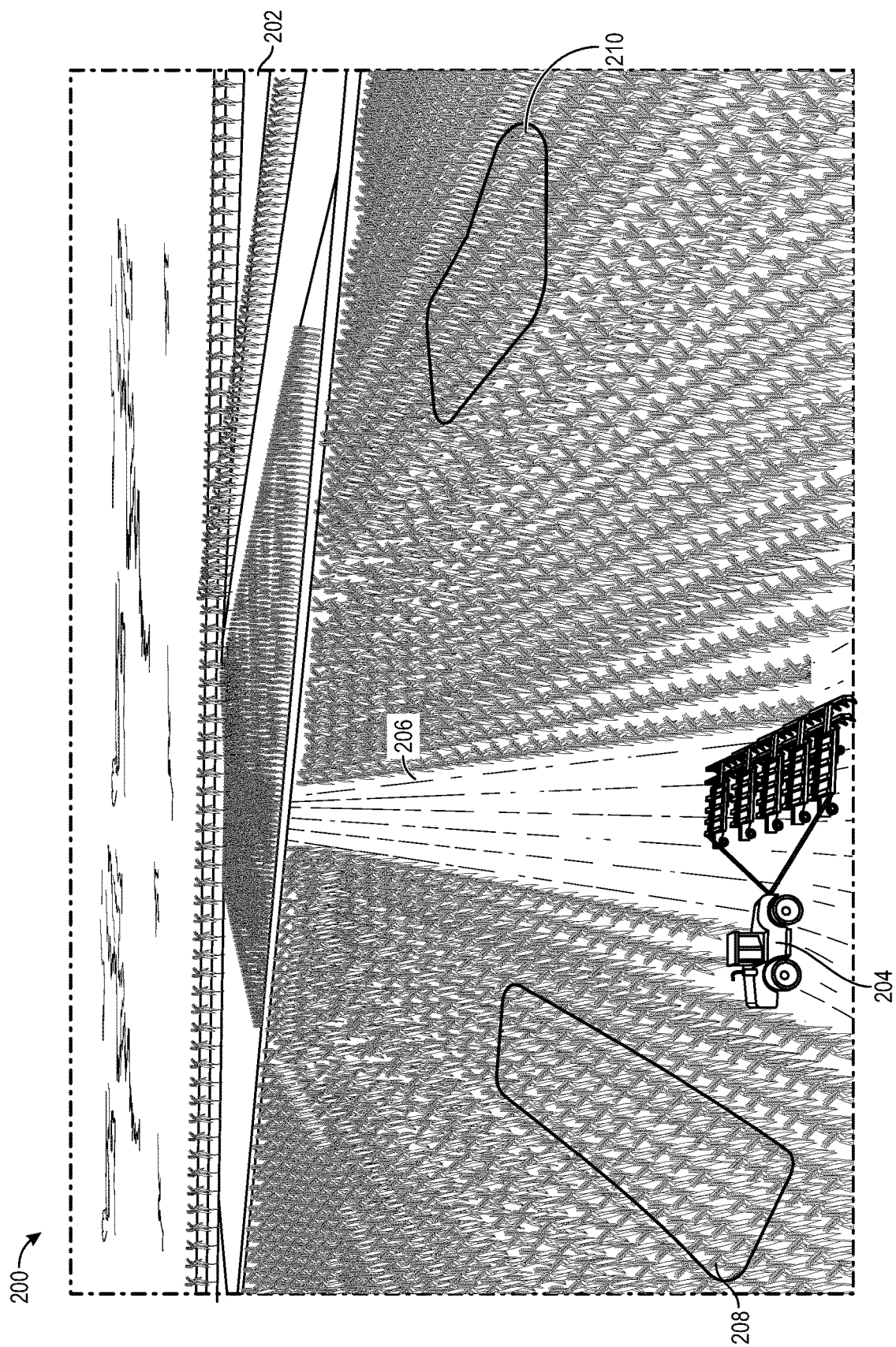
FIG. 2 depicts an exemplary environment of an agricultural field including an implement having one or more attachments, according to an embodiment.

FIG. 2 depicts an exemplary environment 200 of an agricultural field 202 including an implement 204 having one or more attachments. The implement/attachments are performing one or more agricultural operations, or interventions, on the agricultural field 202, wherein the agricultural field 202 is transected by a swath 206 created by the course/direction and action (e.g., tillage, seeding, etc.) of the implement 204. The agricultural field 202 may include one or more crop planted in cultivated rows, vines, or other arrangements. The implement 204 may correspond to the implement 104 of FIG. 1, for example, and may be communicatively coupled and/or physically coupled to one or more attachments (e.g., the one or more attachments 130 of FIG. 1). The agricultural field 202 may have a name and/or identifier that is stored in the database 180 of the remote computing device 106 to allow the various components of the environment 100 to reference the agricultural field 202. The agricultural field 202 may include area 208 and area 210.

The area 208 and the area 210 may both be part of the agricultural field 202, or another field (not depicted). For example, in one embodiment, a field trial may include comparing the area 208 to the area 210, wherein the area 208 and the area 210 are located in different fields (e.g., in different U.S. States).

In operation, the implement 204 may drive the agricultural field 202 in passes parallel to the swath 206. The swath 206 may have a set width that corresponds to the width of the one or more attachments. As the implement 204 drives the agricultural field 202, the implement 204 may include a client computing device (e.g., the client computing device 102 of FIG. 1) that is permanently and/or temporarily installed in the implement 104. The user (e.g., a farmer or other operator) may activate a logging program (e.g., the data collection module 116 of FIG. 1) using an input device (e.g., an input device corresponding to the input device 122 of FIG. 1) to initiate the collection of machine data from the implement 104 and the one or more attachments as the user begins to farm the agricultural field 202. The user may use the input device to navigate various graphical user interfaces displayed by the mobile application module 118, as further described below, before, during and after the farming of the agricultural field 202.

For example, once the user reaches the area 208, the implement 104 may collect machine data corresponding to the area 208. The machine data may be processed by the data collection module 116 and/or the data processing module 150 (e.g., after the client computing device transmits some or all of the machine data to the data processing module 150). The machine data may be encoded in a spatial data format and further processed. For example, once machine data for the entire field 202 has been collected, the field may be divided into hexagrid segments as discussed herein. The matching module 156 may select the hexagrids located within the area 208 and the area 210 and compare them using the matching techniques described herein. Before performing the matching, the matching module 156 may obtain topographic information for the hexagrids within the area 208 and the area 210 from the topographic module 152 of FIG. 1.

In some embodiments, as the user farms the agricultural field 202 using the implement 204, the client computing device receives/retrieves the machine data either locally, in the memory of the client computing device, and/or transmits the machine data to a remote computing device (e.g., the remote computing device 106 of FIG. 1) via a network (e.g., the network 108 of FIG. 1). In some embodiments, a module of the client computing device (e.g., the mobile application module 118) may display status information, such as raw machine data values, processed machine data values, one or more visualizations corresponding to machine data values, engine time, and/or other information related to environmental conditions, the condition of the implement/attachments, etc. that may be of interest to the operator (in non-autonomous embodiments). The data may be displayed, for example, in an output device corresponding to the output device 124 of FIG. 1.

In some embodiments, as the user farms the agricultural field 202, and/or after the user has completed farming the agricultural field 202, the client computing device may transmit data stored in the memory of the client computing device to the remote computing device. The data may be processed and/or stored remotely. For example, in some embodiments, as the user farms the agricultural field 202, the client computing device may receive/retrieve information from the remote computing device. The mobile application module may retrieve/receive a topographic layer and display the topographic layer in the output device 124. In this way, as the user drives the implement 204 on the agricultural field 202, the user is able to simultaneously view a map of the agricultural field 202 including a depiction of how similar the field 202 is to another area.

In some embodiments, the matching module 156 computes a similarity of the field 202 (or a sub-section of the field 202) to another area. However, in some embodiments, the matching module 156 may be relocated to the client computing device 102, so that some or all of the processing is offloaded from the remote computing device 106. Doing so is advantageous when network bandwidth is limited, or when low-latency is desired to increase the data sampling/refresh rate. As noted above, the implement 204 may generate machine data at an interval, such as once per second. The display of machine data, computed matches, etc. may be synchronized such that the display occurs at the same interval as the machine data collection. In this way, the user is able to see the newest information as it is collected.

The present techniques may be thought of supporting multiple modes for the collection, processing, display, analysis and treatment of agricultural processes. As discussed above, the implement 204 may collect data, transmit data, and/or receive data. Therefore, the present techniques support embodiments wherein the implement 204 merely collects data for later processing and/or for real-time processing. For example, during the harvest of the agricultural field 202, a combine implement may make a number of passes transecting the agricultural field 202, wherein the passes correspond to a plurality of swaths 206. Each of the swaths 206 may correspond to a plurality of machine data values. The number of machine data samples within each of the swaths 206 may depend on the speed of the combine implement and the size/configuration of any sensors and/or attachments used to produce the machine data values. In some embodiments, the plurality of swaths may be sub-sections of the field 202, or multiple fields.

In some embodiments, a user may use the present techniques to gather machine data relating to a portfolio including a plurality of fields. The user may do so with the intent of computing environmental matching for each of the respective fields, and/or for other purposes (e.g., for generating an agricultural prescription using the environmental matching information).

For example, the agricultural field 202 may comprise a plurality of swaths 206 each comprising a plurality of machine data values, or samples. The remote computing device 106 may generate a matrix including values corresponding to the plurality of machine data values and the plurality of swaths. Each of the points within the matrix may be associated with metadata, as described below.

The present techniques support embodiments wherein the client computing device merely displays data. For example, as discussed, the client computing device may merely display machine data to the user as the machine data is collected. In some embodiments, the client computing device may display previously-collected/processed data received from the remote computing device (e.g., a map layer, an agricultural prescription, etc.). For example, the user may select the agricultural field 202 from a list of agricultural fields 202 in the client computing device, and a first implement 204 (e.g., the combine implement) via the client computing device. The user may then drive the agricultural field 202 using the first implement 204 to harvest the crop therein. As the user is processing the agricultural field 202, and/or after the user has finished processing the field, the remote computing device 106 may process the machine data collected during the processing.

The user may then drive the agricultural field 202 using a second implement 204 (e.g., a planter or tillage equipment). While the user drives the agricultural field 202 using the second implement 204, the client computing device may receive the processed data and display it for the user in the output device 124. In this way, the user may be provided with a view of a computed attribute of the machine data soon after the user has processed the agricultural field 202.

Exemplary Hexagrid Field-Level Encoding

Internally, the client computing device 102 and the remote computing device 106 (and all modules comprising both) may represent the agricultural field 202 using a 2D hexagonal data structure (i.e., one or more hexagrids). For example, the agricultural field 202 may be represented in computer memory as a grid comprising a plurality of n-meter hexagonal interlocking cells, wherein n is any positive integer. Using hexagonal grids to represent the agricultural field 202 advantageously allows the data representation of the agricultural field 202 to more efficiently tile irregularly-shaped fields in the computer memory. The swath 206 may similarly be represented using hexagrids. All of the field-level data used by the present techniques may be encoded using hexagrids, including without limitation machine data collected by the client computing device 102, and elevation data, underlying environmental characteristics, topographic data, and modeling data processed/transmitted or otherwise facilitated by the remote computing device 106. In some embodiments, other geometric shapes (e.g., squares) may be used to represent the grid.

In some embodiments, a data processing module (e.g., the data processing module 150 of FIG. 1) may correlate the swaths driven by an implement (e.g., the swath 206) to the hexagrids. In this way, the machine data may be assigned to a particular hexagrid. As noted above, interpolation may be performed at the edges of each hexagrid to blend the machine data values to adjacent hexagrids and the enclosing boundaries of each agricultural field. In this way, information corresponding to an individual hexagrid can be displayed in a way that seamlessly conveys to the user per-hexagrid values.

Figure 3:
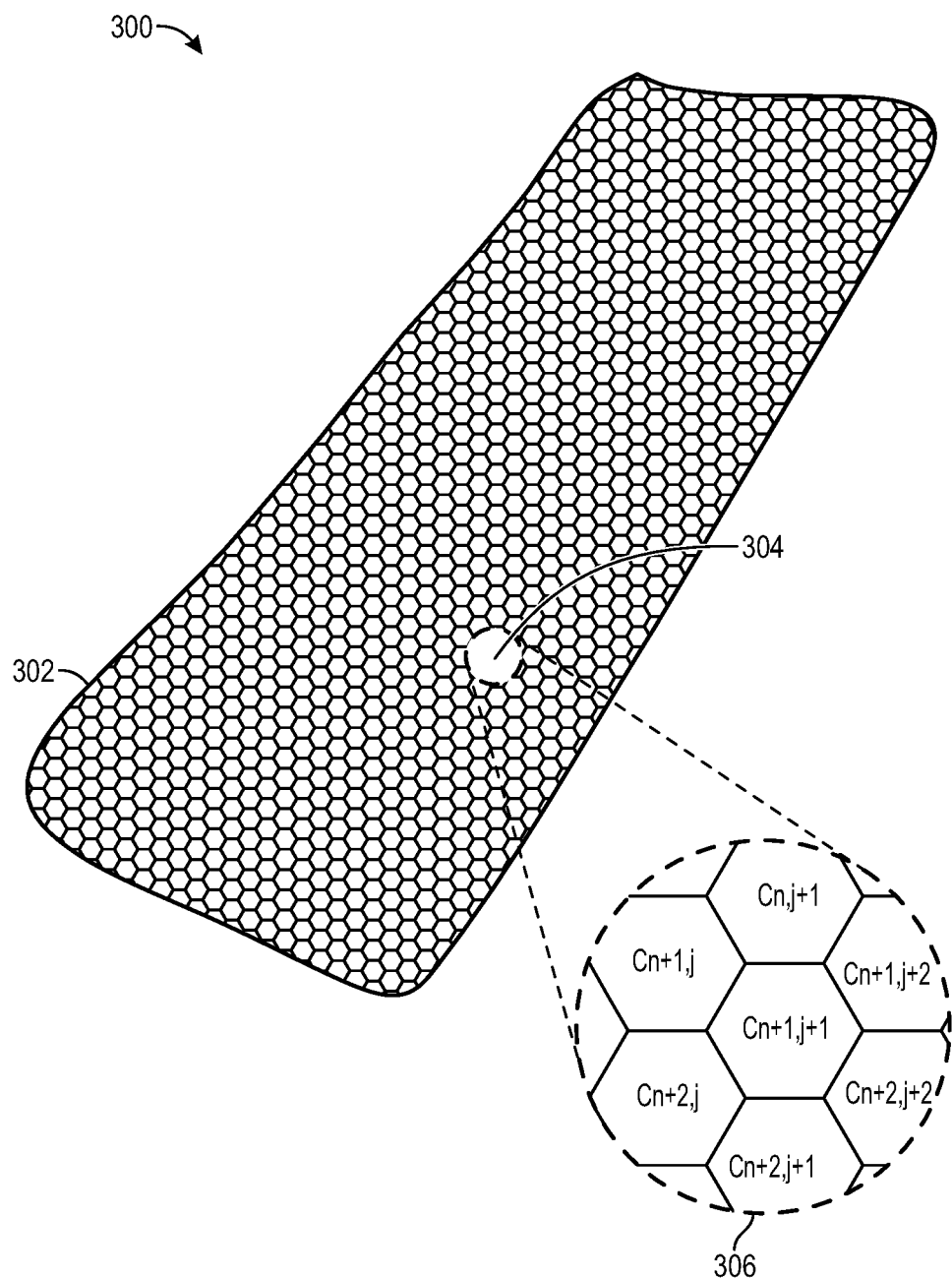
FIG. 3 depicts an exemplary environment, according to an embodiment.

FIG. 3 depicts an exemplary environment 300. The environment 300 includes an area 302 that may correspond to the area 208 of FIG. 2. The area 302 includes a magnified portion 304 that includes a plurality of hexagrids 306. The plurality of hexagrids 306 may be arranged in a linear ordering such that adjacent cells are addressable in two dimensions (e.g., a first dimension n and a second dimension j). Each hexagrid may be associated with a plurality of observations, each of which corresponds to an underlying characteristic.

Exemplary Charts

Figure 4:
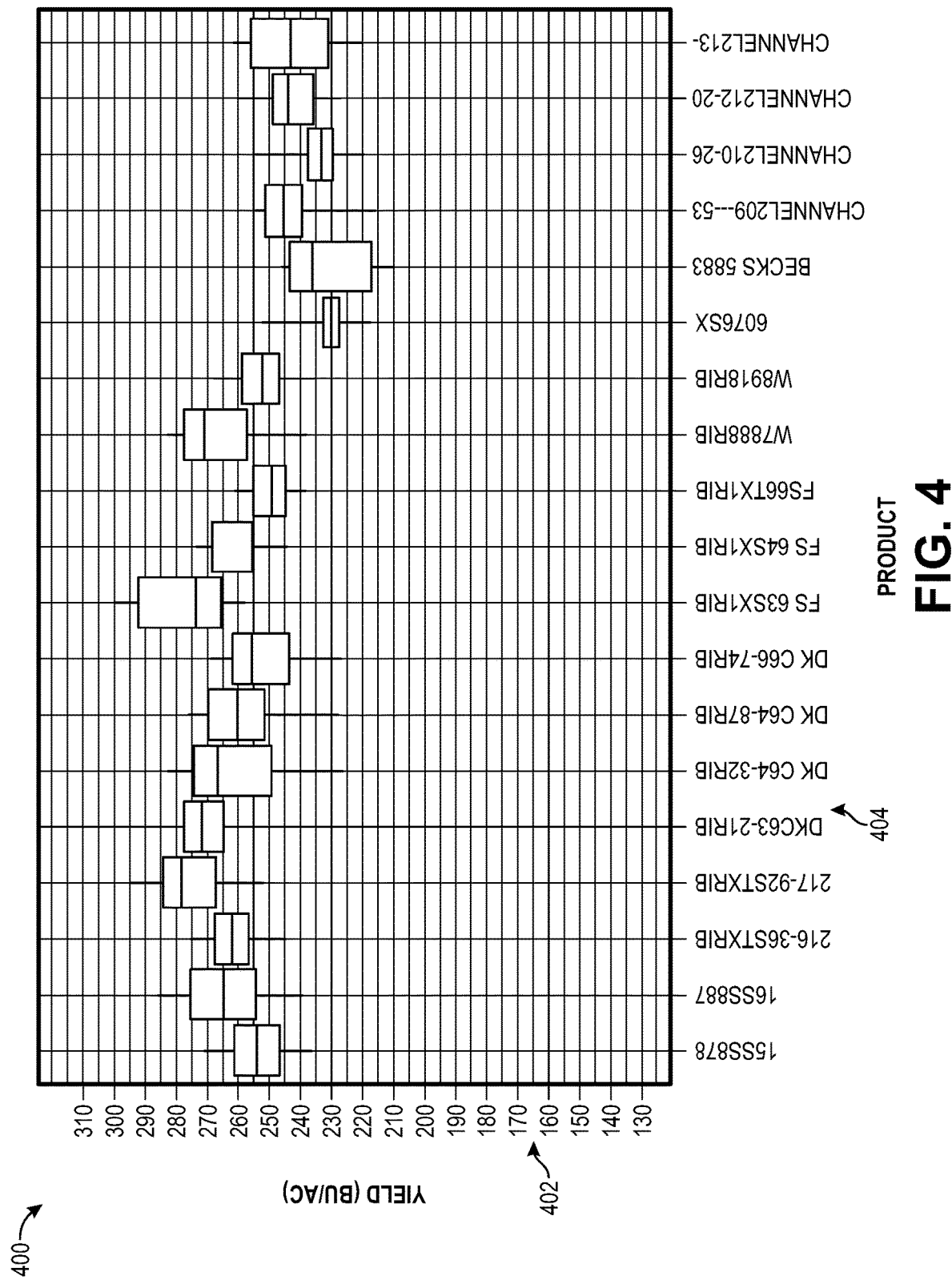
FIG. 4 depicts a product performance chart, according to an embodiment.

The present techniques may be used to generate charts, such as the product performance chart 400 of FIG. 4. For example, the product performance chart depicts yield in bushels per acre on the Y axis of the chart 400, and a multitude of different products on the X axis of the chart 400. In some embodiments, the values used to generate the chart are obtained using the present techniques. For example, the environmental matching methods and systems described herein may be used to determine the matches in observations between a first trial and second trial. The determined matches may be analyzed further to create each of the values along the X axis of the chart 400.

Exemplary Graphical User Interfaces

Figure 5:
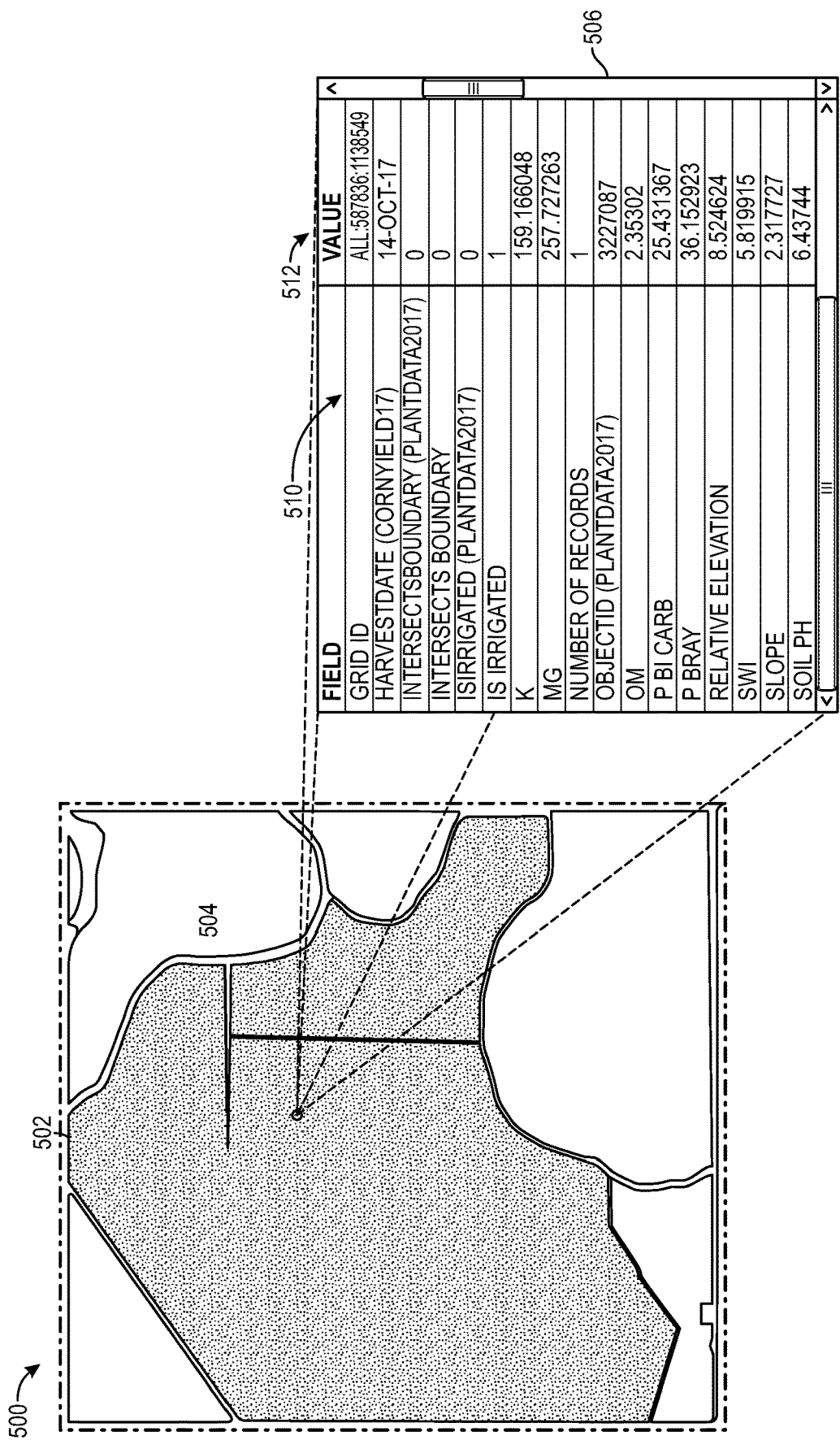
FIG. 5 depicts an exemplary graphical user interface including a field of spatial points, according to an embodiment.

FIG. 5 depicts an exemplary graphical user interface 500 including a field of spatial points 502. The spatial points 502 are each encoded using hexagrids, and the GUI 500 includes a detail point 504. The detail point 504 is shown to include a plurality of point data 506, comprising point metadata and underlying environmental characteristics. The point data 506 includes a keys column 510 wherein each of the respective point data 506 are described, and a values column 512, wherein each of the respective keys in the keys column is associated with a value. For example, the organic matter (OM) key has a value of 2.35302. By using the GUI 500, the user is able to view and explore the plurality of spatial points 502 within the field, and the respective underlying environmental characteristics of each of the spatial points.

Figure 6:
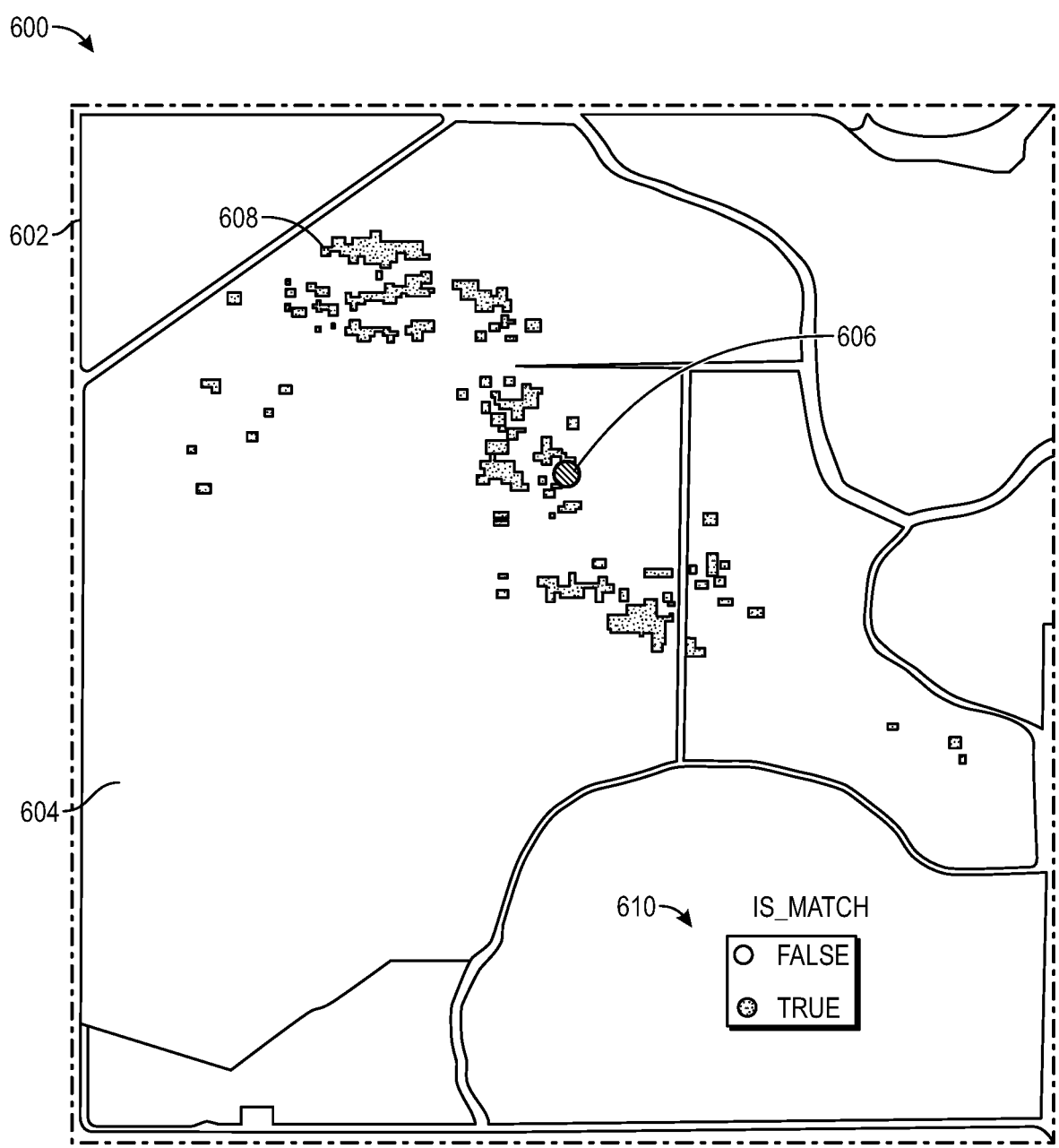
FIG. 6 depicts an exemplary graphical user interface including a field that corresponds to the field depicted in FIG. 5, according to an embodiment.

FIG. 6 depicts an exemplary GUI 600 including a field 602 that correspond to the field depicted in the GUI 500. The field 602 includes a plurality of matching points 608 and a plurality of non-matching points 604. A point 606 corresponds to the detail point 504. The matching spatial points 608 are generated by the environmental matching algorithm, as described herein. The GUI 500 includes a match/no-match indication 610. The GUI 500 and the GUI 600 allow the user to visually assess the points within the field 602 that are a match to another area. In FIG. 5, points may correspond to observations. For example, an observation may be a single measurement of a value (e.g., CEC) at a given point. For example, the GUI 500 and the GUI 600 may be displayed in a display device to a user (e.g., the output device 124 or the output device 184).

In an embodiment, the present techniques include a multi-level environmental characterization/matching algorithm. In some embodiments, the matching module 156 may match environments at a "macro" level. For example, the matching module 156 may analyze precipitation, solar radiation, and evapotranspiration over one or more portions of a growing season, etc. with respect to a plurality of geographic regions/areas that may be near or far. For example, a first region may correspond to the field 202. A second region may correspond to a second field, located across the road/lane or in another state. In another example, the first region and the second region correspond, respectively, to two regions of a single field, as depicted in FIG. 2.

Figure 7:
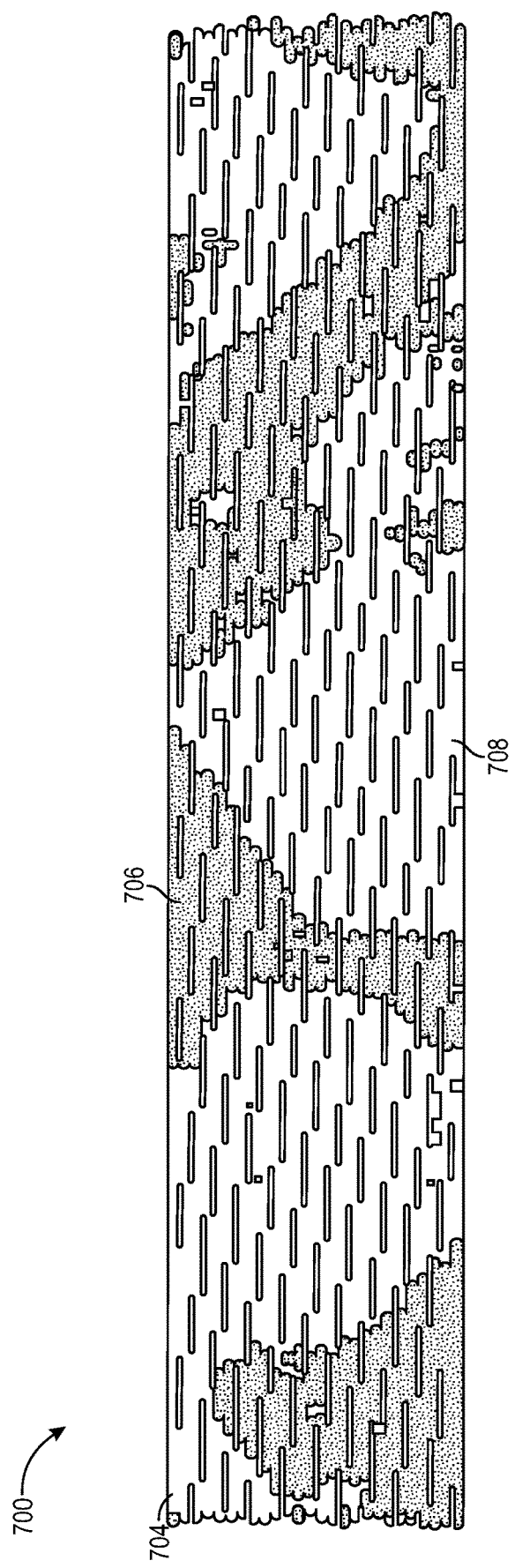
FIG. 7 depicts an exemplary environment that includes a geography, according to an embodiment.
Figure 8:
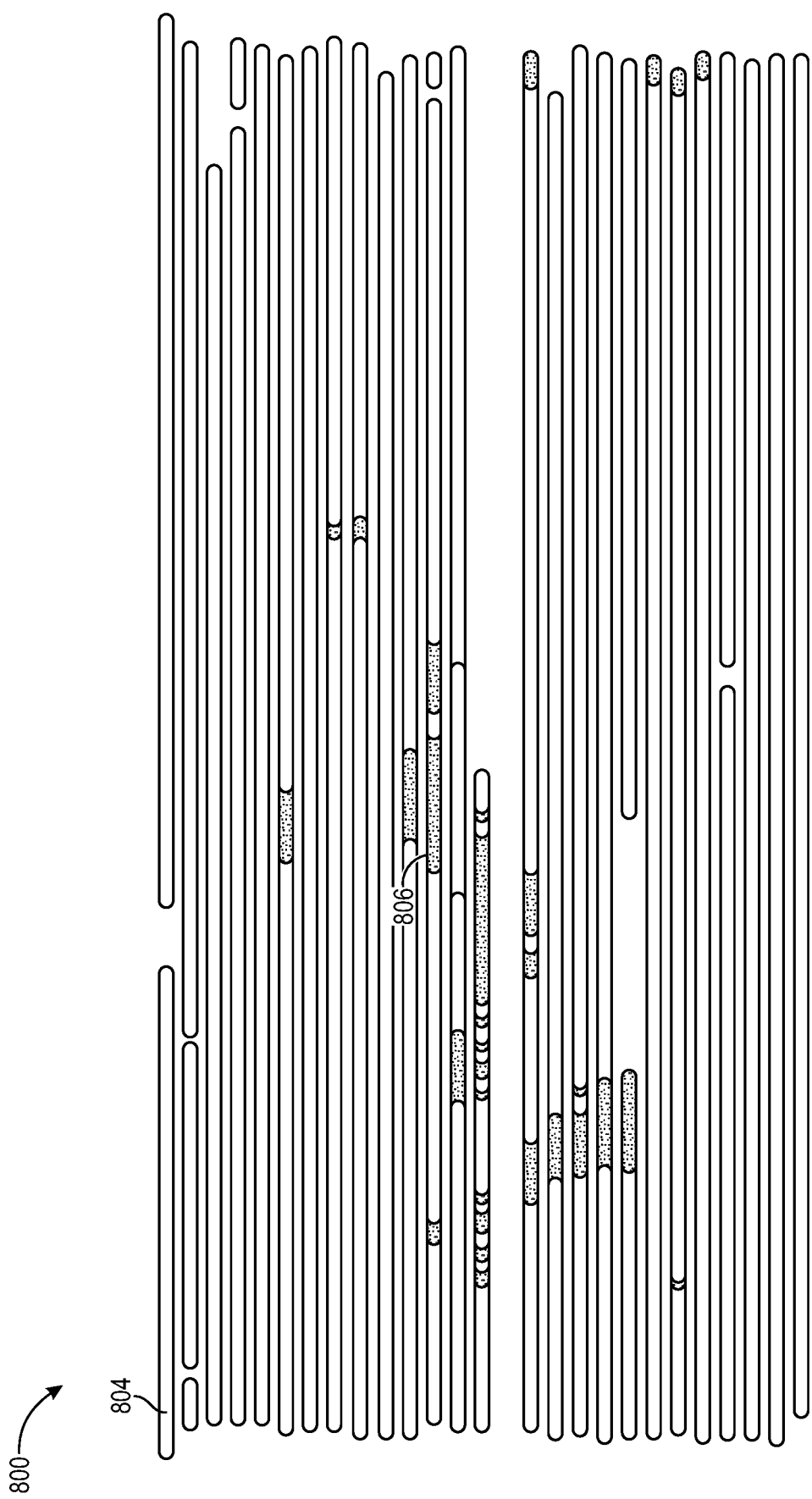
FIG. 8 depicts an exemplary environment that includes a geography, according to an embodiment.

For example, the environmental matching module 156 may implement a method to search a dataset to identify all potential matching observations. The matching observations may be those that correspond to the performance of a particular hybrid or variety. The matching observations may be located across a broad geography. FIG. 7 depicts an exemplary environment 700 that includes a geography 704 including a plurality of matched points 706 and a plurality of unmatched points 708. The geography 704 may correspond to multiple fields, in some embodiments. In some embodiments, the geography 704 may correspond to one or more counties or states. FIG. 8 depicts an example environment 800 that includes a geography including a plurality of matched points 806 and a plurality of unmatched points 804. The geography may correspond to a single field, in some embodiments.

Exemplary Environmental Matching Methods

Figure 9:
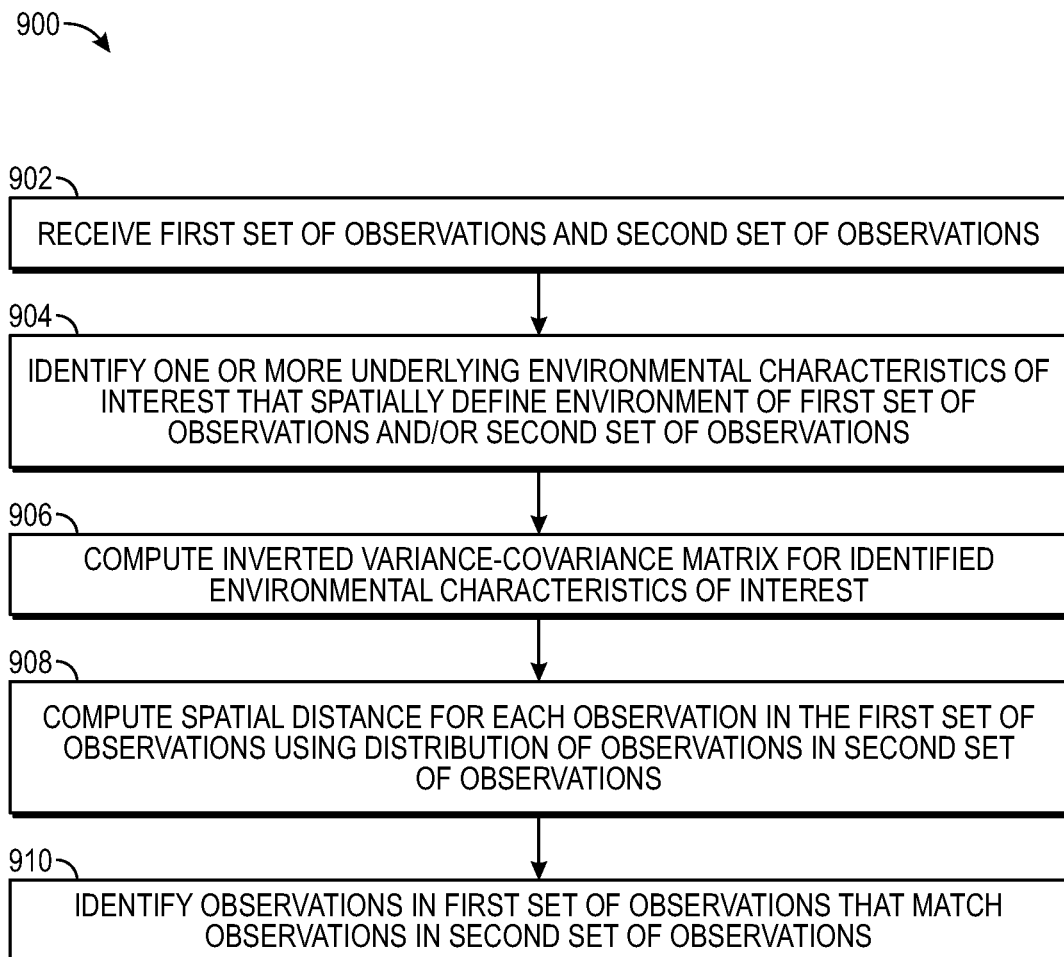
FIG. 9 depicts a flow diagram of an example method for performing environmental matching.

FIG. 9 depicts a flow diagram of an example method 900 for matching a first set of observations in a first plurality of spatial points to a second set of observations in a second plurality of spatial points using a spatial distance function. In some embodiments, each of first set of observations corresponds to a respective one of the second set of observations.

For example, the spatial distance function may be defined as $D^2 = (x-u)^T \Sigma^{-1} (x-u)$. The spatial distance function may determine the distance between each point in the first set of observations and each respective point in the second set of observations. In some embodiments, the generalized distance $D^2$ is unit-less and scale-invariant.

For example, the first set of observations may correspond to a first area (e.g., a field or a sub-field). The second set of observations may correspond to a second area (e.g., a field or a sub-field). The first set of observations and the second set of observations may correspond to the same field. Each set of observations may correspond to a respective population of spatial locations/points (e.g., a set of spatial points within a field).

The method 900 may include receiving the first set of observations and the second set of observations (block 902). In some embodiments, the method 900 may include receiving/retrieving the first set of observations and/or the second set of observations from the database 180 of FIG. 1. In some embodiments, the first set of observations and/or the second set of observations may be provided/retrieved via an API (e.g., by a customer accessing the API module 160). The method 900 may include an implement (e.g., the implement 104) collecting the first set of spatial points/observations.

The method 900 may further include identifying a plurality of underlying environmental characteristics of interest that spatially define the environment for the first set of observations and/or the second set of observations (block 904). For example, the method 900 may include identifying a plurality of defining underlying environmental characteristics using a trained machine learning model (e.g., a random forest tree classification algorithm), a partial-least-squares algorithm, etc.

With reference to the distance function, the method 900 may include computing the inverted variance-covariance matrix $\Sigma-1$ for the identified attributes of interest (block 906).

The method 900 may include computing the spatial distance function for each observation in the first set of observations using the distribution of observations in the second set of observations (block 908). For example, in an embodiment, computing the spatial distance function $D^2$ for each observation in the first set of observations may include computing the spatial distance function for each observation in Xt using the distribution of observations in Xc, wherein Xt and Xc are defined, respectively, as observations corresponding to a treated area and an untreated area. In a further example embodiment, identifying the set of observations may include identifying the observations that will comprise the comparison of a plurality of areas Xi and Xj, wherein Xi and Xj are defined, respectively, as observations corresponding to a first treated area and second treated area. It should be appreciated that the variables i and j are minimal examples, and that multiple pairs of areas may be compared. Alternatively, or in addition, a plurality of areas may be compared.

In another embodiment, computing the spatial distance function for each observation in the set of observations may include computing the spatial distance function $D^2$ for each observation in Xi using the distribution of observations in the set of observations X, wherein Xi is defined as each observation in X.

The method 900 may include identifying the observations in the first set of observations that match the observations in the second set of observations (block 910).

Identifying the observations that match may include generating a set of matched observations. Identifying the observations may include minimizing the spatial distance function $D^2$. Continuing the above example, the method 900 may include identifying the set of attributes in X that match the set of observations in Xi by minimizing the spatial distance function $D^2$. In another example, the method 900 may include identifying a set of matching observations in Xc that match the observation in Xt by minimizing the spatial distance function.

For example, in one embodiment, identifying the observations in the first set of observations that match the observations in the second set of observations may include identifying a set of observations X over a broad geography that are environmentally matched (e.g., by the environmental matching module 156). In another example embodiment, the first set of observations and the second set of observations may respectively correspond to a first spatial trial and a second spatial trial, and identifying the set of observations may include comparing the respective observations within the two trials. For example, the matched observations may correspond to the plurality of matched points 806 of FIG. 8, the plurality of matched points of FIG. 7, the plurality of matching points 608 of FIG. 6, etc.

In some embodiments, the method 900 may further include flagging observations identified in the second set of observations for exclusion from further matching.

Once the method 900 has completed, the first set of observations may include data reflecting a head-to-head matching of each observation in the first set of observations with the second set of observations, according to the identified defining underlying environmental characteristics.

It should be appreciated that the method 900 may be used in embodiments wherein the comparison between the first set of observations and the second set of observations is over a broad geography and/or within a single field. The present techniques provide datapoint-level resolution for analysis, whereas conventional techniques merely compare entire swaths of a field, at best. Growers are able to base decisions on comparisons between multiple areas, for purposes of planting, and when applying agricultural interventions of any kind (e.g., fertilization, application of fungicides/pesticides, irrigation, etc.).

In some embodiments, the method 900 may perform additional analysis on the matched observations, such as by performing a mean difference, a regression, analyzing the matched observations using a random coefficient model, analyzing the matched observations using a random forest tree, etc. The net result of such analyses may include identifying a treatment differences or a product performance in a specific environment. For example, if the grower is able to view a plot of similar points between a plurality of fields (e.g., the matching points 608), then the grower may be able to determine a successful practice that worked on a more successful field within the plurality of fields.

In some embodiments the method 900 may quantify treatment effects. Specifically, the method 900 may determine a marginal effect by, for example, determining how an outcome (e.g., yield) changes when a treatment changes. For example, the method 900 may determine that for a particular percentage increase in fungicide, crop yield will increase by an amount for all areas that correspond to matched observations. In this way, the present techniques may be used to predict treatment outcomes for areas that are environmentally matched.

In some embodiments, computing $D^2$ for each observation may be performed iteratively. In other embodiments, $D^2$ may be computed in different ways, such as recursively and/or using parallel computations (e.g., using one or more GPUs). Using parallel computing algorithms and parallel processing hardware advantageously (e.g., linearly) increases the computational complexity of the present environmental matching techniques, allowing the present techniques to provide drastically improved performance to internal and external (e.g., API) users of agrilytics applications.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for improved agricultural field information storage, comprising
    receiving raw machine data corresponding to a plurality of environments, each environment located within a respective agricultural field;
    determining, for each of the plurality of environments, respective topographic attributes and respective underlying environmental characteristics by processing the raw machine data;
    encoding, for each of the plurality of environments, the determined respective topographic attributes and the respective underlying environmental characteristics in one or more respective hexagrid data structures,
        wherein each respective hexagrid data structure corresponds to an n-meter hexagonal interlocking cell in a grid corresponding to at least one of the agricultural fields; and
    storing the one or more respective hexagrid data structures in one or more non-transitory computer-readable memories.

2. The computer-implemented method of claim 1, further comprising:
    identifying a treatment difference or a product performance corresponding to one or more of the plurality of environments.

3. The computer-implemented method of claim 1, further comprising:
    comparing one or more adjacent hexagrids by interpolating first machine data stored in at least one of the hexagrids with second machine data stored in a different at least one of the hexagrids.

4. The computer-implemented method of claim 1, further comprising:
    displaying the one or more hexagrid data structures on a graphical user interface including one or more spatial points.

5. The computer-implemented method of claim 4, further comprising:
    in response to a user selection of one of the spatial points,
    displaying one or more detail points on a graphical user interface, the detail points corresponding to the selected one of the spatial points.

6. The computer-implemented method of claim 1, further comprising:
    determining one or more matching spatial points corresponding to the one or more hexagrid data structures using a spatial distance function; and
    displaying the one more matching points on a graphical user interface to allow a user to visually assess matching points.

7. The computer-implemented method of claim 1, wherein determining, for each of the plurality of environments, the respective topographic attributes and respective underlying environmental characteristics by processing the raw machine data includes processing the raw machine data using a trained machine learning model.

8. A computing system comprising:
one or more processors; and
one or more memories storing instructions that, when executed by the one or more processors, cause the computing system to:
receive raw machine data corresponding to a plurality of environments, each environment located within a respective agricultural field;
determine, for each of the plurality of environments, respective topographic attributes and respective underlying environmental characteristics by processing the raw machine data;
encode, for each of the plurality of environments, the determined respective topographic attributes and the respective underlying environmental characteristics in one or more respective hexagrid data structures,
wherein each respective hexagrid data structure corresponds to an n-meter hexagonal interlocking cell in a grid corresponding to at least one of the agricultural fields; and
store the one or more respective hexagrid data structures in one or more non-transitory computer-readable memories.

9. The computing system of claim 8, the one or more memories including further instructions that, when executed by the one or more processors, cause the computing system to:
identify a treatment difference or a product performance corresponding to one or more of the plurality of environments.

10. The computing system of claim 8, the one or more memories including further instructions that, when executed by the one or more processors, cause the computing system to:
compare one or more adjacent hexagrids by interpolating first machine data stored in at least one of the hexagrids with second machine data stored in a different at least one of the hexagrids.

11. The computing system of claim 8, the one or more memories including further instructions that, when executed by the one or more processors, cause the computing system to:
display the one or more hexagrid data structures on a graphical user interface including one or more spatial points.

12. The computing system of claim 11, the one or more memories including further instructions that, when executed by the one or more processors, cause the computing system to:
receive a user selection of one of the spatial points; and
display one or more detail points on a graphical user interface, the detail points corresponding to the selected one of the spatial points.

13. The computing system of claim 8, the one or more memories including further instructions that, when executed by the one or more processors, cause the computing system to:
determine one or more matching spatial points corresponding to the one or more hexagrid data structures using a spatial distance function; and
display the one more matching points on a graphical user interface to allow a user to visually assess matching points.

14. The computing system of claim 8, the one or more memories including further instructions that, when executed by the one or more processors, cause the computing system to:
process the raw machine data using a trained machine learning model.

15. A non-transitory computer readable medium containing program instructions that when executed, cause a computer to:
receive raw machine data corresponding to a plurality of environments, each environment located within a respective agricultural field;
determine, for each of the plurality of environments, respective topographic attributes and respective underlying environmental characteristics by processing the raw machine data;
encode, for each of the plurality of environments, the determined respective topographic attributes and the respective underlying environmental characteristics in one or more respective hexagrid data structures,
wherein each respective hexagrid data structure corresponds to an n-meter hexagonal interlocking cell in a grid corresponding to at least one of the agricultural fields; and
store the one or more respective hexagrid data structures in one or more non-transitory computer-readable memories.

16. The non-transitory computer readable medium of claim 15, containing further program instructions that when executed, cause a computer to:
identify a treatment difference or a product performance corresponding to at least one of the plurality of environments.

17. The non-transitory computer readable medium of claim 15, containing further program instructions that when executed, cause a computer to:
compare one or more adjacent hexagrids by interpolating first machine data stored in at least one of the hexagrids with second machine data stored in a different at least one of the hexagrids.

18. The non-transitory computer readable medium of claim 15, containing further program instructions that when executed, cause a computer to:
display the one or more hexagrid data structures on a graphical user interface including one or more spatial points.

19. The non-transitory computer readable medium of claim 18, containing further program instructions that when executed, cause a computer to:
receive a user selection of one of the spatial points; and
display one or more detail points on a graphical user interface, the detail points corresponding to the selected one of the spatial points.

20. The non-transitory computer readable medium of claim 15, containing further program instructions that when executed, cause a computer to:
determine one or more matching spatial points corresponding to the one or more hexagrid data structures using a spatial distance function; and
display the one more matching points on a graphical user interface to allow a user to visually assess matching points.

* * * * *